United States Patent [19]

Ruf et al.

[11] Patent Number: 5,269,970
[45] Date of Patent: Dec. 14, 1993

[54] ELECTRICALLY CONDUCTIVE TIN-IV-OXIDE AND METHOD FOR PRODUCTION THEREOF

[75] Inventors: Erich Ruf, Essen; Joachim Giersberg, Marl-Sinsen; Gerd Dembinski, Essen; Hartmut Gomm, Mülheim; Hans-Günter Krohm, Raesfeld-Erle, all of Fed. Rep. of Germany

[73] Assignee: Th. Goldschmidt AG, Essen, Fed. Rep. of Germany

[21] Appl. No.: 852,348

[22] Filed: Mar. 17, 1992

Related U.S. Application Data

[62] Division of Ser. No. 651,579, Feb. 6, 1991, abandoned.

[30] Foreign Application Priority Data

Feb. 26, 1990 [DE] Fed. Rep. of Germany ....... 4006044

[51] Int. Cl.$^5$ .......................... C01G 19/02; H01B 1/08
[52] U.S. Cl. .................... 252/518; 423/464; 423/494; 423/618
[58] Field of Search ...................... 423/494, 618, 464; 252/518

[56] References Cited

U.S. PATENT DOCUMENTS

| | | | |
|---|---|---|---|
| 3,107,177 | 10/1963 | Saunders | 427/314 |
| 4,113,507 | 9/1978 | McHenry | 252/518 |
| 4,246,143 | 1/1981 | Sonoda | 423/618 |
| 4,258,080 | 3/1981 | Sonoda | 252/518 |
| 4,999,261 | 3/1991 | Perander | 252/518 |
| 5,032,319 | 7/1991 | Ruf | 252/518 |
| 5,085,805 | 2/1972 | Ruf | 252/518 |

FOREIGN PATENT DOCUMENTS

| | | | |
|---|---|---|---|
| 0065724 | 4/1985 | Japan | 423/618 |
| 0260424 | 12/1985 | Japan | 423/618 |
| 2080275 | 2/1982 | United Kingdom | 423/618 |
| 2156386 | 10/1985 | United Kingdom | 423/464 |

Primary Examiner—Paul Lieberman
Assistant Examiner—John Boyd
Attorney, Agent, or Firm—Anderson Kill Olick & Oshinsky

[57] ABSTRACT

Electrically conductive halide doped tin-IV-oxide is disclosed which contains divalent tin in an amount not exceeding 2% by weight and also contains 0.1 to 2.5% by weight, particularly 0.1 to 1.0% by weight, of halide.

Methods for producing the tin-IV-oxide are also disclosed. The product is suitable for imparting electric conductivity in the form of a filler or pigment to a variety of products such as plastics, lacquer, varnish, paint, paper, textiles and toners, without discoloration of the products.

10 Claims, No Drawings

ELECTRICALLY CONDUCTIVE TIN-IV-OXIDE AND METHOD FOR PRODUCTION THEREOF

This is a division of application Ser. No. 07/651,579 filed Feb. 6, 1991 now abandoned.

FIELD OF INVENTION

The invention generally relates to tin oxide and is particularly directed to an electrically conductive tin-IV-oxide containing small amounts of divalent tin and halides.

Considered from another aspect, the invention is concerned with methods for producing the electrically conductive tin-IV-oxide and the use of the electrically conductive tin-IV-oxide as filler or pigment in plastics, lacquers, varnishes, dyes, paper, textiles, toners and the like.

BACKGROUND INFORMATION AND PRIOR ART

It has been known for a long time and is well documented in the literature to apply electrically conductive and infrared reflecting tin oxide layers on substrates such as, for example, glass. The preparation of such electrically conductive and infrared reflecting tin oxide layers applied as coatings on substrates is oftentimes accomplished by pyrolytic decomposition of liquid preparations. These liquid preparations essentially contain one or several base tin compounds and one or several suitable fluoride-containing doping compounds.

A large number of publications and patents are in existence which are directed to such electrically conductive and infrared reflecting tin oxide layers which are coated onto substrates. The same applies for the liquid preparations for the preparation of such tin oxide layers.

According to the prior art, the preparations referred to are usually applied to the substrate, such as glass, in a spray-atomizing procedure, the substrate, e.g., the glass, having been previously heated. This results in pyrolytic or pyrogenic decompositions of the compounds contained in the preparations and, in turn, in the deposition on the substrate of the electrically conductive and infrared reflecting tin oxide layers which, thus, become bonded to the substrate.

The electrical conductivity is generated by fault points in the respective tin oxide layers, the fault points being formed for the most part by the added doping agents. In this manner, fault point terms or donor terms are produced only slightly below the conduction band through which, if necessary with slight energy expenditure, electrons can be brought into the conduction band. This, however, is not the case with respect to pure, undoped tin oxide because of the prohibited zone which is present between valence band and conduction band.

Electrically conductive pigments are necessary to generate electrical conductivity or properly to adjust the anti-static properties of a variety of solid and liquid technical products such as, for example, plastics, lacquers, paints, papers, toners and textiles. In addition to metal powders and graphite, which necessarily cause a dark dyeing of such technical products, semi-conductors in powder form are used for this purpose. In so doing, it is desirable to employ semi-conductor pigments which have not only high electrical conductivity or low specific resistance, but which also are as white as possible or at least have a light color and are of fine grain size.

For the indicated purpose it is known to use conductive tin oxides which are doped with antimony. Such antimony doped tin oxides have been used directly and applied on carrier materials such as, for example, titanium oxide. However, such electrically conductive tin oxides have several disadvantages. Due to the doping with antimony, such conductive tin oxides, dependent on the antimony content and the annealing temperature, have a blue color of varying intensity. Moreover, antimony oxide-containing tin oxides as, indeed, generally all antimony oxide-containing materials, carry with them certain health and environmental risks and are therefore not favored at the workplace.

OBJECTS OF THE INVENTION

It is the principal object of the invention to provide halide doped tin-IV-oxides of light color which can be produced in a simple and inexpensive manner from readily accessible raw materials.

It is also an object of the invention to provide doped tin oxides of the indicated kind which are free from environmental and health risks.

Generally, it is an object of the invention to improve on the art of electrically conductive tin-IV-oxides.

SUMMARY AND PREFERRED EMBODIMENTS OF THE INVENTION

Pursuant to the invention, conductive tin-IV-oxide comprises divalent tin in an amount not exceeding 2% by weight and 0.1 to 2.5% by weight of halides, the divalent tin and the halides being present individually or in mixture.

Pursuant to a preferred embodiment of the invention, the amount of divalent tin does not exceed 1.5% by weight, while the halide amount is 0.1 to 1.0% by weight, the tin and the halide again being present individually or in mixture.

The inventive halide doped electrically conductive tin oxides, dependent on the manner in which they are produced and the kind and quantity of doping, are gray or light colored. It has been ascertained that of the halide doped electrically conductive tin oxide, tin oxides doped with fluoride are slightly superior with respect to electrical conductivity and temperature stability to those that have been doped with chloride, bromide or iodide. By contrast, the chloride or bromide or iodide doped tin oxides are superior to the fluoride doped tin oxides as concerns color appearance, since the former are of lighter color than the fluoride doped oxides.

The inventive conductive tin-IV-oxides exhibit a specific resistance of $<50\Omega\cdot m$. The measured values of fluor doped tin-IV-oxides are usually $<10\Omega\cdot m$, particularly about 0.3 to $2\Omega\cdot m$.

The inventive halide doped electrically conductive tin oxides may be prepared pursuant to different procedures. In one of the procedures or methods pursuant to the invention tin-II-oxide is mixed by grinding with up to 20% by weight, calculated on the mixture, of tin-II-fluoride or an equivalent amount of hydrofluoric acid and that the mixture is annealed in a temperature range of about 200° to 700° C., whereupon the annealed product is ground until the desired particle size has been obtained.

In the above procedure, it is preferred if the product mixture of tin-II-oxide and tin-II-fluoride or hydrofluoric acid, respectively, is admixed with low molecular alcohols such as, e.g., methanol or ethanol.

Instead of using solid tin-II-oxide for reaction with the solid tin-II-fluoride, it is feasible to employ freshly precipitated tin-II-hydroxide or basic tin-II-hydroxide products.

Pursuant to another procedure for preparing the inventive halide doped tin-IV-oxides which makes use of solid tin-II-fluoride, tin-IV-oxide is mixed by grinding with up to 20% by weight, calculated on the mixture, of tin-II-fluoride. The mixture is annealed in a temperature range of about between 200° to 700° C. and the annealed product is ground until the desired particle size has been obtained. Also, mixtures of tin-II-oxide and tin-IV-oxide can be used in this procedure.

Still another method resides in that, in known manner, basic tin-II compounds and/or basic tin-II-hydroxides are precipitated from tin-II salt solutions. The precipitation products thus obtained are washed several times and thereafter stirred with 5 to 70% by weight, calculated on precipitated basic tin-II compounds, of tin-II-fluoride in the form of an aqueous solution. The stirring is conducted during a period of 5 to 60 minutes. The doped precipitation products thus obtained are separated from the solution and dried at temperatures of about between 100° to 200° C. Thereafter, the products are annealed at temperatures of about between 200° to 700° C. and the annealed product is ground until the desired particle size has been obtained.

Moreover, it is also feasible to precipitate in known manner basic tin-II compounds and/or basic tin-II-hydroxides from tin-II salt solutions. The precipitation is carried out in the presence of 1 to 70% by weight, calculated on precipitated basic tin-II compounds, of tin-II-fluoride and the doped precipitation products are separated from the solution. The precipitation products are then washed and dried at temperatures of about between 100° to 200° C., whereupon the products are annealed at temperatures of about between 200° to 700° C. The annealed product is ground until the desired particle size has been obtained.

A still further inventive procedure is characterized by introducing 10 to 100% by weight, calculated on tin-II-halide, of alkylene oxide into aqueous tin-II-halide solutions which results in precipitation products. The precipitation products are thereupon separated from the solution, are washed and dried at temperatures of about between 100° to 200° C. Thereafter, the products are annealed at temperatures of about between 200° to 700° C. and the annealed product is ground until the desired particle size has been obtained.

Ethylene oxide is the preferred alkylene oxide for the above purpose. By introducing ethylene oxide into a tin-II-chloride solution which contains dissolved tin-II-fluoride in amounts sufficient to accomplish the desired doping, tin-II-hydroxide chloride precipitates in practically quantitative amounts. In some instances, minor amounts of tin-II-hydroxide may be contained in the precipitate.

At the same time, ethylene chlorohydrin is formed in this manner, which remains in the aqueous phase. If this precipitation product is washed and thereafter dried at temperatures between 100° to 250° C., preferably at about 200° C., and is subsequently annealed in the manner mentioned above, a tin oxide of excellent electrically conductive properties is obtained which may be further ground in order to obtain the desired particle fineness.

If one performs the above-mentioned precipitation by introduction of alkylene oxide, preferably ethylene oxide, without preceding dissolution of tin-II-fluoride, then a fluoride-free tin-II-chloride hydroxide is precipitated which may contain, in some instances, small amounts of tin-II-hydroxide. If this product, after repeated washing and subsequent drying, is annealed in the above-mentioned manner, a fluoride-free chloride doped electrically conductive tin oxide is obtained.

Chloride and/or bromide or iodide doped electrically conductive tin oxides may also be produced in simple manner by grinding mixtures of tin-II-oxide and tin-IV-oxide with, calculated on the mixture, up to 20% by weight of tin-II-halides. The mixture thus obtained is then annealed in a temperature range of about between 200° to 700° C., whereupon the annealed product is ground until the desired particle size has been obtained.

Due to their particular physical characteristics, the inventive compounds are excellent fillers or pigments for use in plastics, laquers, paints, papers, textiles and toners, imparting them with the desired electrically conductive properties without causing substantial discoloration.

It is common to all the inventive procedures referred to above that the products, obtained in different manners, are all annealed. As indicated, the annealing is accomplished at temperatures of about 200° to 700° C. A preferred annealing range is about 300° to 500° C.

The inventive halide doped electrically conductive tin oxides as well as the different procedures for their preparation will now be described in greater detail by the following examples, which are given by way of illustration and not by way of limitation.

EXAMPLE 1

250 gram of tin-II-oxide, 29.5 gram of tin-II-fluoride and 11.7 gram of methanol were introduced into a mortar mill in which the components were thoroughly mixed for 10 minutes by grinding. The product mixture thus obtained was thereupon annealed in a corundum dish for 1 hour at 500° C. During the annealing, the annealed product is once mixed by raking. After cooling, the annealed product is further ground in a mortar mill for 10 minutes.

The electrically conductive tin oxide thus obtained had a specific resistance of 1.3 $\Omega \cdot m$.

The tin-II content amounted to $<0.3\%$. The fluoride content amounted to 0.9%.

EXAMPLE 2

250 gram of tin-II-oxide, 14.75 gram of tin-II-chloride and 14.75 gram of tin-II-fluoride are introduced into a mortar mill and are thoroughly mixed for 10 minutes. The mixture thus obtained is annealed in a corundum dish for 1 hour at 300° C. After cooling, the thus obtained electrically conductive tin oxide is further ground in a mortar mill for 10 minutes.

The electrically conductive tin oxide thus obtained has a specific resistance of 1 $\Omega \cdot m$.

The tin-II content amounted to 0.8%. The fluoride content was 0.49%, while the chloride content was 0.3%.

EXAMPLE 3

125 gram of tin-IV-oxide and 14.75 gram of tin-II-fluoride are fed into a mortar mill. The two compounds are thoroughly mixed by grinding for 10 minutes. The mixture thus obtained is subsequently annealed in a corundum dish for 1 hour at 300° C. The annealed product, upon cooling, is further ground in a mortar mill for 10 minutes.

The electrically conductive tin oxide thus obtained has a specific resistance of 12 Ω·m.

The tin-II content was <0.3%, while the fluoride content amounted to 0.9%.

EXAMPLE 4

250 gram of tin-II-oxide are slowly stirred in a beaker with a methanolic (70%) tin-II-chloride solution for 20 minutes. The supernatant phase is thereafter decanted. The product thus obtained is dried for 1 hour at 200° C. and is subsequently annealed in a corundum dish for 1 hour at 500° C. During the annealing period, the product is once mixed by raking. After cooling, the annealed product is ground in a mortar mill. The electrically conductive tin oxide thus obtained has a specific resistance of 8 Ω·m.

The tin-II content amounted to 0.5%, while the chloride content amounted to <0.3%.

EXAMPLE 5

250 gram of tin-II-oxide and 29.5 gram of tin-II-iodide were introduced into a mortar mill and were thoroughly mixed therein by grinding for 10 minutes. The product mixture thus obtained was annealed in a corundum dish for 1 hour at 500° C. During the annealing period, the product was once mixed by raking. Subsequently, the annealed product, after cooling, was again ground for 10 minutes in a mortar mill.

An electrically conductive tin oxide is obtained which has a specific resistance 36 Ω·m.

The tin-II content was 1.8%, while the iodide content was 1.2%.

EXAMPLE 6

250 gram of tin-II-oxide and 34.0 gram of hydrobromic acid (48% concentration) are thoroughly mixed in a mortar mill by grinding for 10 minutes. The mixture thus obtained is annealed in a corundum dish for 1 hour at 500° C. During the annealing period, the product is mixed once by raking. The annealed product, upon cooling, is again ground in a mortar mill for 10 minutes.

The thus obtained electrically conductive tin oxide has a specific resistance of 40 Ω·m.

The tin-II content amounted to <0.3%, while the bromide content amounted to 1.0%.

EXAMPLE 7

This experiment was carried out in a 2 liter, four neck flask with a reflux cooler, thermometer, stirrer and ground glass stopper. 670 gram of aqueous tin-II-chloride solution (38.3% concentration) are charged to the flask. Under stirring, 28.4 gram of solid tin-II-fluoride is added and the mixture is stirred for about 20 minutes until an almost clear solution has been obtained. 101.2 gram of ethylene oxide are slowly introduced into this solution within about 5 hours. Due to the exothermic reaction, the reaction mixture heats up to 45° C. After a few minutes of introducing ethylene oxide, basic tin-II-chloride precipitates with small amounts of tin-II-hydroxide under the simultaneous formation of ethylene chlorohydrin. After the entire amount of ethylene oxide has been introduced, the precipitated product thus obtained is filtered off through a suction filter. The filter product is washed twice with about 250 ml of water each time, whereupon the product is dried in a rotation evaporator in vacuum for 2 hours (3 mm Hg).

The product thus obtained is subsequently annealed in a corundum dish for 1 hour at 500° C. During the annealing period, the product is once mixed with a rake. The annealed product, upon cooling, is ground for 10 minutes in a mortar mill.

An electrically conductive tin oxide with a specific resistance of 2Ω·m is obtained.

The tin-II content amounted to <0.3%, while the chloride content was 0.5%. The amount of fluoride was 1.2%.

EXAMPLE 8

This experiment was carried out in a manner analogous to that of Example 7, however without the use of tin-II-fluoride. In this manner, an electrically conductive tin oxide with a specific resistance of 12Ω·m was obtained. The tin-II content amounted to <0.3%, while the chloride content amounted to 0.4%.

EXAMPLE 9

This experiment was carried out in a 3 liter beaker into which were charged 950 ml of tin sulfate solution containing 125 gram of Sn(II)/l and 400 ml of a 20% tin-II-fluoride solution. The mixture was stirred.

950 ml of a 16.5% ammonium hydrogen carbonate solution were added to the mixture under stirring at room temperature.

A white precipitation product was obtained which was washed 5 times with 2.5 liters of water each time, with the water after each washing being decanted. The washed precipitated product is subsequently dried in a porcelain dish at 110° C. for 12 hours, whereupon it is annealed in a corundum crucible at 500° C. for 1 hour. During the annealing period, the product was once mixed by a rake. After the annealing and cooling, the product is passed through a 630-μm sieve and the product passing through the sieve is again annealed for 15 minutes at 500° C. The annealed product thus obtained is passed through a 100-μm sieve.

The electrically conductive tin oxide passing through the sieve has a specific resistance of 0.3Ω·m.

The tin-II content amounted to <0.3%, while the fluoride content amounted to 1%.

We claim:

1. A method for producing electrically charged tin-IV-oxide having a divalent tin content of, at the most, 2% by weight and having a halide content of between about 0.1 to 2.5% by weight, said divalent tin and said halide being present in the tin-IV-oxide individually or in mixture, said method of comprising:

mixing by grinding tin-II-oxide with tin-II-fluoride or hydrofluoric acid, wherein said tin-II-fluoride or hydrofluoric acid is present in an amount up to 20% by weight of the mixture;

thereafter annealing the mixture thus obtained at a temperature range of about between 200° to 700° C.; and grinding the annealed product to obtain said tin-IV-oxide in a predetermined particle size.

2. The method as claimed in claim 1, wherein a lower molecular alcohol is added to the mixture of tin-II-oxide and tin-II-fluoride or hydrofluoric acid.

3. The method as claimed in claim 2, wherein said alcohol is methanol or ethynol.

4. A method for producing electrically conductive tin-IV-oxide having a divalent tin content of, at the most, 2% by weight and having a halide content of between about 0.1 to 2.5% by weight, said divalent tin and said halide being present in the tin-IV-oxide individually or in mixture, said method comprising:

- precipitating basic tin-II compounds, basic tin-II-hydroxides or mixtures thereof from tin-II salt solutions;
- washing the precipitated products thus obtained;
- stirring the washed precipitation products with 5 to 10% by weight, calculated on the precipitated basic tin-II compounds, of tin-II-fluoride in the form of an aqueous solution, said stirring being performed during a period of about between 5 to 60 minutes, whereby doped precipitation products are obtained;
- separating the doped precipitation products from the solution;
- washing them;
- drying the doped precipitation products at temperatures of between about 100° to 200° C.;
- annealing the doped products at temperatures of about between 200° to 700° C.; and
- thereafter grinding the annealed product into small particles of predetermined size.

5. A method for producing electrically conductive tin-IV-oxide having a divalent tin content of, at the most, 2% by weight and having a halide content of between about 0.1 to 2.5% by weight, said divalent tin and said halide being present in the tin-IV-oxide individually or in mixture, said method comprising:

- precipitating basic tin-II compounds, basic tin-II-hydroxides or mixtures thereof from tin-II salt solutions;
- conducting the precipitation in the presence of 1 to 70% by weight, calculated on precipitated basic tin-II compounds, of tin-II-fluoride, whereby doped precipitation products are obtained;
- separating the doped precipitation products from the solution;
- washing the doped precipitation products;
- drying the doped precipitation products at temperatures of about between 100° to 200° C.;
- thereafter annealing the products at temperatures of about between 200° to 700° C.; and
- grinding the annealed product into particles of predetermined size.

6. A method for producing electrically conductive tin-IV-oxide having a divalent tin content of, at the most, 2% by weight and having a halide content of between about 0.1 to 2.5% by weight, said divalent tin and said halide being present in the tin-IV-oxide individually or in mixture, said method comprising:

- introducing 10 to 100% by weight, calculated on tin-II-halide, of alkylene oxide into an aqueous tin-II-halide solution, whereby a precipitation product is obtained;
- separating the precipitation product from the solution;
- drying the precipitation product at temperatures of about between 100° to 200° C.;
- annealing the product thereafter at temperatures of about between 200° to 700° C.; and
- grinding the annealed product into particles of predetermined size.

7. The method as claimed in claim 6, wherein ethylene oxide is the alkylene oxide.

8. A method for producing electrically conductive tin-IV-oxide having a divalent tin content of, at the most, 2% by weight and having a halide content of between about 0.1 to 2.5% by weight, said divalent tin and said halide being present in the tin-IV-oxide individually or in mixture, said method comprising:

- mixing by grinding tin-IV-oxide with, calculated on the mixture, up to 20% by weight of tin-II-fluoride;
- annealing the mixture thus obtained in a temperature range of about between 200° to 700° C.; and
- grinding the annealed product into particles of predetermined size.

9. A method for producing electrically conductive tin-IV-oxide having a divalent tin content of, at the most, 2% by weight and having a halide content of between about 0.1 to 2.5% by weight, said divalent tin and said halide being present in the tin-IV-oxide individually or in mixture, said method comprising:

- mixing by grinding a mixture of tin-II-oxide and tin-IV-oxide with, calculated on the mixture, up to 20% by weight of tin-II-halide;
- annealing the mixture thus obtained in a temperature range of about between 200° to 700° C.; and
- grinding the annealed product into particles of predetermined size.

10. A method as claimed in claims 1, 4, 5, 6, 8 or 9, wherein the mixture is annealed in a temperature range of about between 300° to 600° C.

* * * * *